Dec. 10, 1968 J. T. CHUSS 3,415,679

METALLIZATION OF SELECTED REGIONS OF SURFACES
AND PRODUCTS SO FORMED

Filed July 9, 1965

INVENTOR
J. T. CHUSS
BY J. J. Landis
ATTORNEY

United States Patent Office 3,415,679
Patented Dec. 10, 1968

3,415,679

METALLIZATION OF SELECTED REGIONS OF SURFACES AND PRODUCTS SO FORMED

John T. Chuss, Hokendauqua, Pa., assignor to Western Electric Company, Incorporated, New York, N.Y., a corporation of New York Filed July 9, 1965, Ser. No. 470,843
8 Claims. (Cl. 117—212)

ABSTRACT OF THE DISCLOSURE

A selected region of a silicon slice is coated with a layer of nickel by (1) forming a layer of silicon dioxide on all portions of the slice except the selected region, (2) forming on the entire slice a porous film of tin-palladium having such integrity so as to permit nickel plating thereon and such porosity so as to permit solvent penetration therethrough, (3) removing the tin-palladium overlying the silicon dioxide by applying through the film a solvent that will dissolve the silicon dioxide but not the silicon or tin-palladium, and (4) plating nickel on the remaining tin-palladium film.

Figure 1:
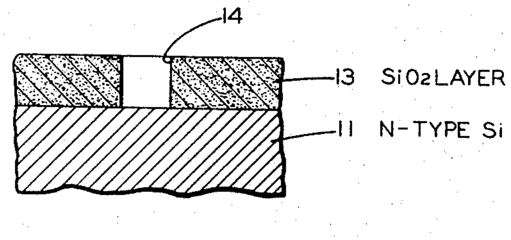
Figure 2:
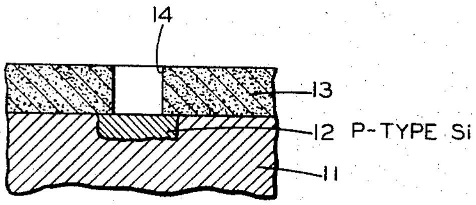

This invention relates generally to methods of applying a coating of a metal to a selected region on a surface of a base material. In a specific example, the invention relates to methods of applying a nickel coating to a selected region of the surface of a silicon slice in the manufacture of semiconductors, and to metallized silicon slices so formed. Accordingly, the general objects of the invention are to provide new and improved methods of such character, and to provide new and improved nickel-coated silicon slices.

In the specific example of nickel plating a selected region of a silicon slice, a method in accordance with the invention includes, as a first step, treating the surface of the slice to form a layer of silicon dioxide covering all portions of the slice except the selected region. Next, the entire surface is "sensitized" by dipping in a solution of stannous chloride, after which the surface is "activated" by immersion in a palladium chloride solution. These treatments deposit an extremely thin film of tin and palladium on the entire surface, both the silicon portion to be plated and the $SiO_2$ layer. Next, the tin-palladium film is removed from the $SiO_2$ layer by treating the surface with a selective solvent for $SiO_2$, but not for silicon, tin or palladium. The tin-palladium film on the $SiO_2$ is sufficiently porous that the solvent penetrates and dissolves an outer layer of the $SiO_2$. This treatment is continued for a sufficient time to remove all of the tin and palladium from the $SiO_2$ portion. There is no apparent effect on the tin-palladium film on the silicon at this time because of the selective nature of the solvent. After the tin-palladium film has been so removed from the $SiO_2$ portion, a coating of nickel is deposited by conventional electroless plating techniques on the tin-palladium film, which acts as a catalyst for the nickel deposition. Nickel-platings are such that nickel does not deposit on the $SiO_2$ portion. Following the nickel deposit, the slice may be treated in any conventional manner to form an ohmic contact, such as by sintering the nickel to form a good bond to the silicon, followed by electroplating a noble metal, such as gold, on the nickel.

In more general terms, the selected metal coating (Ni in the example) may be any metal "X" which will deposit from the plating solution onto the catalytic metal film, but which will not deposit directly on the oxide layer. The base material "Y" (Si in the example) may be any material on which the catalytic film will deposit from the plating solution. The catalytic metal "Z" (Sn-Pd in the example) must be one which will deposit from the plating solution on both the base material Y and the oxide, to form a porous film at least on the oxide layer which is capable of acting as a catalyst for the deposition of the coating metal X. The oxide must be one on which the catalytic metal Z will deposit in a porous film, on which the coating metal X will not deposit, and which can be dissolved by a selective solvent which will not attack Y or Z.

Other objects, advantages and features of the invention will be apparent from the following detailed description of a specific embodiment thereof (nickel plating of silicon using a tin-palladium catalyst), when taken in conjunction with the accompanying drawings, in which FIGS. 1–5 illustrate diagrammatically a silicon slice on a highly exaggerated scale during various stages of the process.

BACKGROUND—MANUFACTURE OF PLANAR SEMICONDUCTORS

Figure 5:
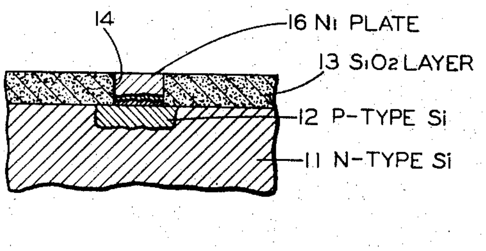

Referring first to FIG. 5, the specific embodiment of the invention concerns the manufacture of a planar diode consisting of a slice 11 of N-type silicon having a P-type surface region 12. As noted in FIG. 1, a protective layer of $SiO_2$ 13 is formed or grown on the surface of the slice 11 covering all portions of the surface except for the selected region, a "window" 14 where the P-type region is to be formed. In accordance with conventional techniques, the oxide film is grown by oxidation in a furnace, and the window 14 is etched by conventional masking techniques. Next, a P-type impurity such as boron is diffused through the window, to form the P-type region 12 indicated in FIG. 2.

Background information with respect to the formation of diffused planar semiconductors of this general type may be obtained from such prior patents as Levi Patent 2,995,473, Hoerni Patent 3,064,167, or Andrus Patent 3,122,817.

In the specific embodiment, the invention is concerned with plating an adherent coating of nickel 16 (FIG. 5) in the window 14 only, to serve as a foundation and barrier layer for the production of an ohmic contact to the P-type region 12.

PREPARATION OF THE SLICE

Prior to any metallizing steps (FIG. 2), the window areas must be cleared of oxides, generally termed "boron glass," which are formed during the diffusion of the P-type region 12. Generally the oxides are removed using conventional photo-etching and masking techniques. The solvent used is, for example, a 2:1 solution of ammonium fluoride in hydrofluoric acid. After the oxides are removed a very thin layer of "boron-crud" may be encountered which is extremely stable and difficult to remove. Generally, this boron-crud causes sporadic and inconsistent plating when employing a conventional chemical nickel plating process. The boron-crud is soluble in nitric acid-hydrofluoric acid solvents; however, these solvents are also detrimental to the $SiO_2$ 13 and the P-type region 12. By employing the methods comprising the instant invention direct plating over the thin layer of boron crud is achieved.

DEPOSIT OF THE CATALYTIC FILM

The next step in the process is to "sensitize" the entire surface of the slice by dipping the slice in an acid stannous chloride solution. This step per se is prior known in the formation of electroless nickel coatings on various nonmetals including silicon. Typical references describing this process are Bergström Patent 2,702,253, Sauer et al. Patent 3,071,522, or ASTM Special Technical Publication No. 265 "Symposium on Electroless Nickel Plating," p. 36 (Nov. 1959). The precise action of the stannous chloride treatment is not known, but it is believed that an extremely thin film of metallic tin is deposited on the surface which serves as a catalyst for further metallic deposition in the following steps. This assumed tin film is designated by the numeral 17 in FIG. 3. A typical stannous chloride bath consists of:

| | | |
|---|---|---|
| $SnCl_2$ | grams/liter | 70.0 |
| HCl | ml./liter | 40 |
| Temperature | °C. | 25 |

The stannous chloride dip is quite brief, about one minute, after which the slice is immediately rinsed thoroughly with deionized water using gentle agitation.

Figure 3:
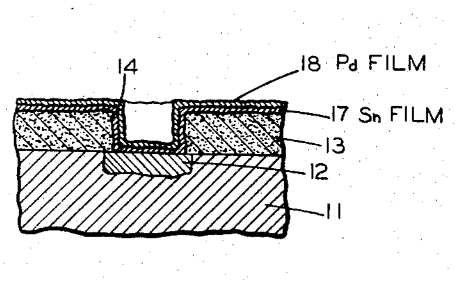
Figure 4:
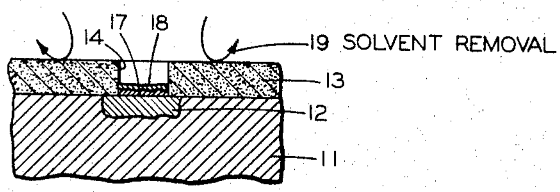

The next step is to "activate" the tin film by treatment with an acid palladium chloride solution, which is believed to deposit a thin film of metallic palladium, indicated by the numeral 18 in FIG. 3, across the entire surface. This palladium treatment, in combination with the tin treatment, is also well-known as a preliminary to the deposition of nickel on nonmetals, as indicated by the publications mentioned in the preceding paragraph.

One suitable example of a suitable palladium chloride bath consists of:

| | | |
|---|---|---|
| $PdCl_2$ | gram/liter | 0.1 |
| HCl | ml./liter | 1.0 |
| Temperature | ° C. | 25 |

The palladium chloride dip is also quite brief, for example 20–30 seconds, after which the slices are again rinsed with deionized water to remove the palladium chloride solution, termed "dragout." The palladium film is not continuous over the entire surface of $SiO_2$ layer. In accordance with the invention, the palladium chloride dip must be only for a long enough period to form a porous film on the $SiO_2$ layer. Whether or not the palladium deposit on the U-type silicon 12 is also porous is not known, but the exact nature of the palladium deposit on the silicon does not appear to be critical with respect to the practice of the invention. It is critical that the combined Sn-Pd deposit on the $SiO_2$ layer be sufficiently porous that a selective solvent for $SiO_2$ can penetrate the Sn-Pd film and dissolve the underlying $SiO_2$.

SELECTIVE REMOVAL OF THE Sn-Pd FILM

The next step in the process is to treat the entire surface of the slice with a selective solvent for $SiO_2$, but not for silicon, palladium or tin, to remove the Sn-Pd porous film from the $SiO_2$ layer but not from the window 14. Such a selective solvent is the ammonium fluoride-hydrofluoric acid mixture previously mentioned (two part $NH_4F$ to one part HF). In this step, the solvent seeps through the porous Sn-Pd film 17–18 to eat away the underlying $SiO_2$, thereby floating away the Sn-Pd deposit as indicated by the arrow 19 in FIG. 4. This treatment is continued only for so long as is necessary to remove the Sn-Pd film, 5–7 seconds in the specific example. This merely avoids removing any more $SiO_2$ than is necessary.

NICKEL PLATING STEP

After this selective etching step, the remainder of the process is generally conventional, with the nickel coating 16 deposited on the Sn-Pd film 17–18 only, in the general way disclosed in the references previously mentioned. One suitable example of an electroless nickel plating bath follows:

| | | |
|---|---|---|
| Nickelous chloride-$NiCl_2 \cdot 6H_2O$ | grams | 30 |
| Sodium hypophosphite-$NaH_2PO_2 \cdot H_2O$ | do | 10 |
| Ammonium citrate-$(NH_4)_2HC_6H_5O$) | do | 65 |
| Ammonium chloride-$NH_4Cl$ | do | 50 |
| Distilled or deionized water | ml | 920 |

Dissolve the above in water in the order indicated. Heat the solution to 90–95° C. and add sufficient ammonium hydroxide to change the color of the solution from green to a deep blue (pH 8–10). Plate with the solution immediately and maintain the pH by adding ammonium hydroxide to replace evaporation losses.

The nickel coating process is autocatalytic, as is well-known in the art. Thus, the nickel coating 16 may be plated to any desired thickness to suit the purpose. In the particular example, the nickel coating is of the order of .1 to .2 mil. After the nickel has been plated, the slice is further treated in any conventional manner to add the desired contact material, such as additional nickel, gold or silver. In the specific example, the nickel is sintered at 750° C. for four minutes in a dry nitrogen ambient to provide a firm mechanical and electrical bond with the silicon, after which gold is electroplated on the nickel coating, generally as described in the Sauer et al. patent, to a thickness of 1 to 2 mils. Another type of contact which is contemplated for some applications consists of successive layers of palladium, rhodium and silver, after the nickel-plating step.

The primary advantage of the subject process is that consistent and reliable plating on the P-type silicon in the window 14 is obtained including those windows with a layer of boron crud; whereas sporadic and inconsistent plating occurs when conventional nickel plating processes are used. Also a firmer bond is obtained between the plated nickel and the P-type silicon 12 by the subject process.

OTHER EXAMPLES

While one specific example of the invention has been described in detail hereinabove, it will be realized that various modifications may be made from the specific details described without departing from the spirit and scope of the invention. In particular, while the process of the invention has especial utility in the application of nickel coatings to silicon slices, the general principles are applicable to selective plating of various other metals on a base, wherein the operating principles of the invention previously described may be brought into play. In particular, the base material must be one which itself can be oxidized to form an oxide layer of sufficient thickness for the purposes of the invention, or on which a different oxide (such as silicon dioxide) can be deposited in a firmly adherent, relatively thick layer. For the invention to have practical utility, the coating metal must be one which is difficult to deposit to form a sufficiently well-adherent coating on the bare base material, but which will deposit to form a firmly adherent coating when a suitable catalytic film is used, such as the Sn-Pd deposit in the specific example. There is no problem where the catalytic film does not deposit on the particular oxide layer used, but where it has an affinity for both the bare base material and the oxide layer, then the process of the present invention is especially useful. In this case, the intentionally porous film of the catalytic metal is first formed under carefully controlled conditions on the oxide layer, after which it is removed along with a portion of the oxide by the selective undercut solvent techniques described, leaving the catylitic film on the desired region to be coated.

What is claimed is:

1. A method of applying a coating of nickel to a selected region of a surface of a silicon substrate, which comprises:

treating the surface to form an oxide layer covering all portions except the selected region;

immersing the partially oxide-coated silicon substrate into an aqueous solution containing approximately 70 grams/liter of $SnCl_2$ and approximately 40 ml./liter of HCl for about one minute to sensitize the substrate;

immersing the sensitized substrate into an aqueous solution containing approximately 0.1 gram/liter of $PdCl_2$ and approximately 1.0 ml./liter of HCl for about 20–30 seconds to form an adherent porous Sn-Pd deposit on the substrate that is sufficiently porous to permit a selective solvent for $SiO_2$ to penetrate therethrough, yet is sufficiently thick, contiguous, and strongly adhered to the substrate to provide a base layer capable of tenaciously adhering to a subsequently plated nickel layer;

penetrating the porous Sn-Pd deposit with a selective $SiO_2$ solvent to dissolve a sufficient quantity of the underlying $SiO_2$ to remove the $SiO_2$ and the porous Sn-Pd deposited thereon from the substrate; and then treating the resultant substrate with an electroless nickel plating solution to deposit an adherent coating of nickel onto the porous Sn-Pd deposit remaining adhered to the substrate.

2. The method of applying a nickel coating to a selected region of the surface of a silicon slice, which comprises:

treating the surface to form a layer of silicon dioxide covering all portions except the selected region;

treating the surface first with a stannous chloride solution and then with a palladium chloride solution to deposit a catalytic film of tin and palladium on the entire surface, which film is porous at least on the silicon dioxide layer;

treating the surface with a selective solvent for silicon dioxide, but not silicon, tin or palladium, until sufficient silicon dioxide has been removed to remove the porous catalytic film from the silicon-dioxide layer; and then treating the surface with an electroless nickel-plating solution of a type which deposits nickel only on the catalytic film at the selected region.

3. A silicon slice having a nickel coating on a selected region of its surface, prepared in accordance with the method of claim 2.

4. The method of applying a nickel-gold contact to a selected region of the surface of a silicon slice, which comprises:

applying a nickel coating in accordance with the method recited in claim 2;

sintering the nickel coating to provide a strong mechanical and electrical bond between the silicon and the nickel; and then depositing gold on the nickel coating.

5. A silicon slice having a nickel-gold contact on a selected region of its surface, prepared in accordance with the method of claim 4.

6. A method of applying a coating of metal on a porous film of tin-palladium adhered to a selected region of a surface of a silicon slice, which comprises:

treating the surface to form a layer of silicon dioxide covering all portions except the selected region;

treating the resultant surface first with a stannous chloride solution and then with a palladium chloride solution to deposit thereon a porous film of tin and palladium having sufficient integrity to tenaciously adhere to the silicon slice and to a subsequently coated metal and having sufficient porosity to permit penetration therethrough of a selective silicon dioxide removing solvent;

applying a selective silicon dioxide removing solvent that will not dissolve silicon, tin or palladium to the film covered surface of the slice to penetrate the film thereon and to dissolve a sufficient quantity of the underlying silicon dioxide to release the porous bonded film from the silicon dioxide layer; and then treating the resultant surface with an electroless plating solution of a type which deposits metal only on the film of tin-palladium at the selected region.

7. A method as set forth in claim 6, wherein the deposited metal is nickel.

8. A method of plating a predetermined metal over a selected area of a substrate, wherein the metal will not plate on or adhere to an oxide of the substrate, which comprises:

forming a layer of an oxide of the substrate about the selected area, but not on the selected area of said substrate;

depositing a porous Sn-Pd film over said oxide layer and the selected area, said film characterized by an ability to tenaciously adhere to both said oxide layer and the selected area of said substrate, and by an ability to bond to the predetermined metal;

penetrating said porous film with an etchant that will attack said oxide, but not the substrate material, to remove a portion of said oxide layer and said Sn-Pd film deposited thereon; and depositing the predetermined metal onto said Sn-Pd film adhered to the selected area of said substrate.

References Cited

UNITED STATES PATENTS

| | | | |
|---|---|---|---|
| 3,269,861 | 8/1966 | Schneble et al. | 117—212 |
| 2,995,473 | 8/1961 | Levi | 117—212 X |

RALPH S. KENDALL, *Primary Examiner.*

A. M. GRIMALDI, *Assistant Examiner.*

U.S. Cl. X.R.

117—47, 213, 217; 317—234; 156—17